Patented July 21, 1942

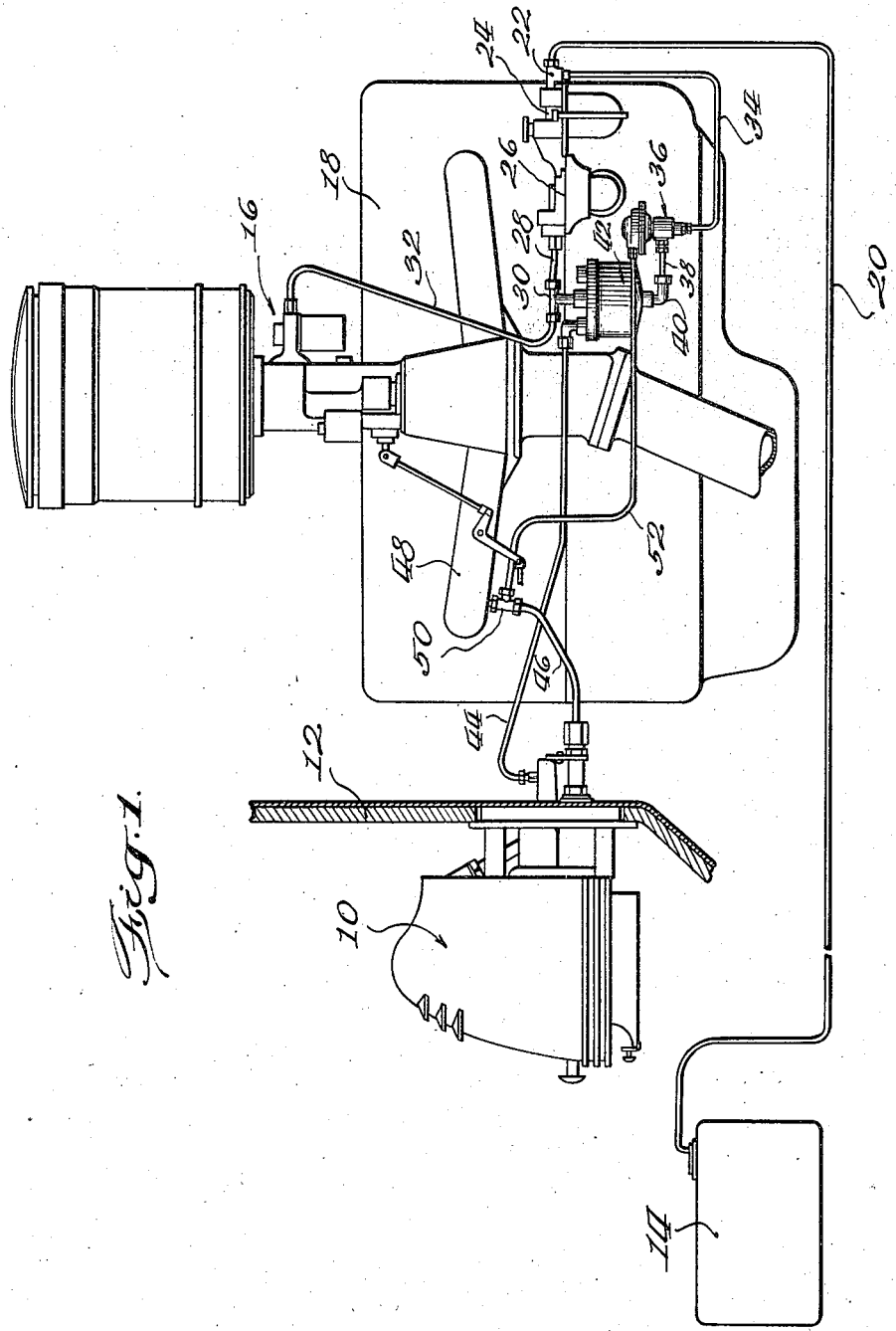

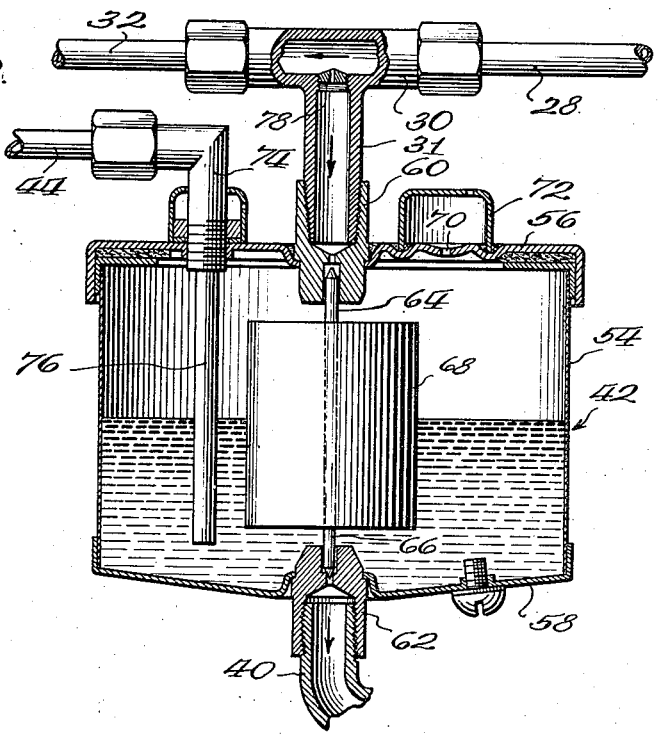
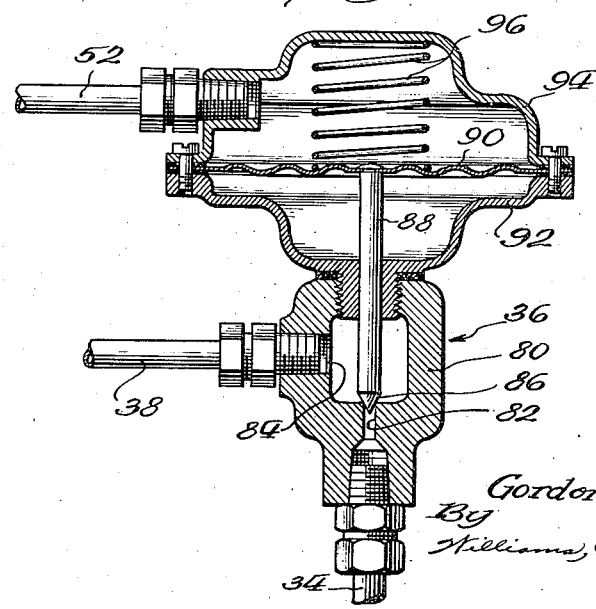

2,290,227

UNITED STATES PATENT OFFICE 2,290,227

FUEL SUPPLY SYSTEM FOR AUTOMOBILE HEATERS

Gordon J. Fairbanks, Chicago, Ill., assignor to Stewart-Warner Corporation, Chicago, Ill., a corporation of Virginia Application November 24, 1941, Serial No. 420,186

4 Claims. (Cl. 237—12.3)

My invention relates generally to automobile heating systems, and more particularly to improvements in the fuel supply system for automobile heaters of the internal combustion type and for the supply of liquid fuel to other fuel-consuming devices which are intermittently operated.

In the operation of fuel supply systems for automobile heaters of the internal combustion type, difficulty has been experienced occasionally due to the deposits of gum and the like upon valves and around orifices, the gum being a residue from gasoline which has evaporated during the summer time or other long period during which the heater was not operated. This difficulty was overcome by the use of a system including an auxiliary reservoir through which gasoline was circulated whether or not the heater was in operation. The level of the fuel in this auxiliary tank was maintained constant so that any time that the heater controls were operated to place the heater in operation there was available for the heater a supply of fresh gasoline at the proper level. This solution of the problem is more fully described in the co-pending application of H. J. DeN. McCollum and Thomas F. Spackman, Serial No. 312,064, filed January 2, 1940, which has matured into Patent No. 2,270,956, dated January 27, 1942.

The system disclosed in the aforesaid application operated satisfactorily in most portions of the United States, but some trouble with the system was experienced in Pittsburgh, Pennsylvania, and San Francisco, California, and a few other cities in which vehicles equipped with the system of said application were occasionally parked on hills so steep that the main gasoline tank of the automobile was at a level above that of the auxiliary fuel tank. Due to this difference in elevation, it was possible for the gasoline to flow through the auxiliary tank in a reverse direction and escape therefrom through its air vent. The primary purpose of the present invention is to provide means for preventing such very undesirable leakage of gasoline from the auxiliary tank.

It is thus an object of my invention to provide an improved fuel feeding system for internal combustion type automobile heaters and the like in which the fuel is continuously circulated through an auxiliary reservoir in which the level is accurately maintained, and to provide means for preventing the escape of fuel from such auxiliary tank when the automobile is parked with the main fuel tank at a level higher than that of the auxiliary tank.

A further object is to provide a fuel feeding system for automobile heaters of the internal combustion type in which safety means are provided to prevent the leakage of fuel from the system.

Other objects will appear from the following description, reference being had to the accompanying drawings, in which:

Fig. 1 is a generally diagrammatic elevational view of a portion of an automobile showing a heater and the improved fuel supply system installed thereon;

Fig. 2 is a central vertical sectional view of the auxiliary fuel reservoir; and Fig. 3 is a central vertical sectional view of a vacuum operated fuel flow control valve forming part of the system.

Referring to Fig. 1, the system is illustrated as for the purpose of supplying gasoline or other liquid fuel to a fuel consuming apparatus, shown as a heater of the internal combustion type designated generally by the reference character 10. This heater may be of the type shown in the patent to Henry J. DeN. McCollum, No. 2,191,174, issued February 20, 1940.

The heater 10 is shown as suitably mounted upon the dash 12 of an automobile so as to be capable of heating air in the passenger compartment of the automobile. Fuel is supplied from the main tank 14 to the carburetor 16 for the automobile engine 18 through a conduit 20 leading from the main tank 14 to a T 22, through a strainer 24, fuel pump 26, conduit 28, T 30, and conduit 32. A conduit 34 connects the T 22 with the outlet of a vacuum operated valve, designated generally by the reference character 36. The inlet of the valve 36 is connected by a conduit 38 and elbow 40 with an auxiliary float controlled tank 42 which is supplied with fuel through connection with the T 30. Fuel is adapted to be withdrawn from the auxiliary tank 42 through a conduit 44 connected to the heater 10. The products of combustion from the heater 10 are withdrawn therefrom through a conduit 46 connected to the intake manifold 48 of the engine 18 through a T 50. One branch of the T 50 is connected by a conduit 52 with the vacuum operated valve 36.

The details of construction of the auxiliary fuel reservoir 42 and vacuum operated valve 36 are shown in Figs. 2 and 3. The auxiliary tank 42 comprises a cylindrical shell 54 having a suitable top 56 and bottom 58, the top being provided with an inlet fitting 60 and the bottom with an outlet fitting 62, these fittings providing seats for an inlet valve 64 and an outlet valve 66 respectively, the valves being secured to a float 68. The top 56 is vented to the atmosphere through an opening 70 which is covered by an apertured protecting cap 72. The connection of the conduit 44 to the tank may be by way of an elbow fitting 74 which may be in the form of a carbureting device for the admission and mixture of air with fuel drawn from the tank 42 through a flow rate controlling device 76. The details of construction of the elbow 74 and device 76 are more fully disclosed in the copending application of Henry J. DeN. McCollum, Serial No. 326,560, filed March 29, 1940.

The inlet fitting 60 is connected to the depending leg 31 of the T 30 and the flow through this leg is limited by an apertured restriction plug 78.

The vacuum operated valve, as shown in Fig. 3, comprises a body 80 having an outlet port 82 connected to the conduit 34 and an inlet 84 connected to the conduit 38. The port 82 is normally closed by a valve 86, the stem 88 of which is secured to a flexible diaphragm 90 which forms a dividing partition across a housing formed by a body 92 and cap 94. The body 92 is suitably secured to the body 80, while the cap 94 has its interior suitably connected to the conduit 52. A coil spring 96 compressed between the cap 94 and diaphragm 90 urges the latter downwardly and hence normally holds the valve 86 in position closing the port 82.

From the foregoing, it will appear that when the automobile is not in operation the valve 86 will be closed by the spring 96 since the force of the latter upon the diaphragm 90 will not be opposed by the suction of the intake manifold. As a result, no fuel can flow from the main tank 14 through conduits 20, 34, and 38 to the auxiliary tank 42, and the possibility of flooding the auxiliary tank with dangerous leakage through the air vent thereof is eliminated. Thus, even though the automobile is parked on a steep slope so that the main tank 14 is at a level considerably above that of the auxiliary tank 41, no leakage from the latter will occur. However, as soon as the engine is started, the reduced pressure of the intake manifold will be applied to the upper surface of the diaphragm 90, overcoming the compression of the spring 96 and opening the valve 86. Thereafter, whether or not the heater 10 is in operation, fuel will continuously flow through the apertured plug 78 into the auxiliary fuel reservoir 42, and when the latter becomes sufficiently filled to cause opening of the valve 66 and closing of the valve 64, the fuel will flow through the elbow 40 and past the then open valve 86 and conduit 34 to the inlet end of the fuel pump 24. The valves 64 and 66 operate by the float 68 and will alternately close as the fuel level in the auxiliary tank varies so that fuel will alternately flow into and from the tank, thereby maintaining a supply of fresh fuel available for withdrawal to the heater 10 whenever the latter is to be operated.

The utilization of the intake manifold vacuum for operating the valve 86 has many advantages, particularly in simplicity, non-interference with other functions of the automobile, and in durability. Under some circumstances, it may, however, be preferable to provide other means for the operation of the valve 86. For example, this valve may be operated by a solenoid connected in the ignition circuit or by any other suitable means which will be rendered operative to open the valve incidental to the initiation of operation of the automobile and which will maintain the valve open throughout the period that the automobile engine is in operation. I therefore desire, by the following claims, to include within the scope of my invention, all such variations and modifications which will occur to those skilled in the art, by which substantially the results of my invention may be obtained by the use of substantially the same or equivalent means.

I claim:

1. In a fuel supply system for automobile heaters and the like forming parts of an automobile driven by an internal combustion engine having an intake manifold, a carburetor therefor, a fuel supply tank, and a fuel pump connected to withdraw fuel from said supply tank and deliver it to the carburetor; the combination of an auxiliary tank having an inlet and an outlet, the inlet being connected to receive fuel from the fuel pump, a conduit forming a connection between the outlet of said auxiliary tank and the inlet of the fuel pump, a valve controlling the flow through said conduit, resilient means to hold said valve closed, and means responsive to the intake manifold vacuum to open said valve against the force of said resilient means.

2. In a fuel supply system for automobile heaters and the like forming parts of an automobile driven by an internal combustion engine having an intake manifold, a carburetor therefor, a fuel supply tank, and a fuel pump connected to withdraw fuel from said supply tank and deliver it to the carburetor; the combination of an auxiliary tank having an inlet and an outlet, the inlet being connected to receive fuel from the fuel pump, a conduit forming a connection between the outlet of said auxiliary tank and the inlet of the fuel pump, a valve controlling the flow through said conduit, and means responsive to the operation of the internal combustion engine to hold said valve open while the engine is in operation.

3. In a fuel supply system for automobile heaters and the like forming parts of an automobile driven by an internal combustion engine having an intake manifold, a carburetor therefor, a fuel supply tank, and a fuel pump connected to withdraw fuel from said supply tank and deliver it to the carburetor; the combination of an auxiliary tank vented to the atmosphere and having an inlet and an outlet, the inlet being connected to receive fuel from the fuel pump, float controlled valve means for alternately closing said inlet and said outlet, a conduit forming a connection between said outlet and the inlet of the fuel pump, a valve controlling the flow through said conduit, and means responsive to discontinuance of the operation of said engine to hold said valve closed when said engine is not in operation, whereby fuel is prevented from flowing from said main tank to said auxiliary tank even though said main tank is at a level higher than that of said auxiliary tank.

4. In a fuel supply system for automobile heaters and the like forming parts of an automobile driven by an internal combustion engine having an intake manifold, a carburetor therefor, a fuel supply tank, and a fuel pump connected to withdraw fuel from said supply tank and deliver it to the carburetor; the combination of an auxiliary tank having an inlet and an outlet, the inlet being connected to receive fuel from the fuel pump, a conduit forming a connection between the outlet of said auxiliary tank and the inlet of the fuel pump, and automatically operable valve means in said conduit to prevent flow of fuel therethrough when the automobile is parked with its fuel supply tank at a level below that of said auxiliary tank.

GORDON J. FAIRBANKS.